Feb. 8, 1966 C. WONG 3,234,320

INTEGRATED CIRCUIT PACKAGE

Filed June 11, 1963

Inventor:
Chih Wong,
by Gordon Wellman
Att'y.

United States Patent Office 3,234,320

Patented Feb. 8, 1966

3,234,320
INTEGRATED CIRCUIT PACKAGE

Chih Wong, Arlington, Mass., assignor to United-Carr Incorporated, a corporation of Delaware Filed June 11, 1963, Ser. No. 287,045
1 Claim. (Cl. 174—50.5)

This invention relates generally to hermetically sealed electrical assemblies and more specifically to means of engaging the wire leads to the assembly.

An object of the present invention is to provide a means for preventing the cracking of a glass seal engaged with a wire lead when the wire lead is exposed to frequent and/or physical movement.

Another object of the present invention is to provide means of protecting a glass seal from cracking when a wire lead associated therewith must be bent.

A still further object of the present invention is to provide an integral header and heat sink and structure tab for use with electrical assemblies.

Other objects of the invention will, in part, be obvious and will, in part, appear hereinafter.

Figure 1:
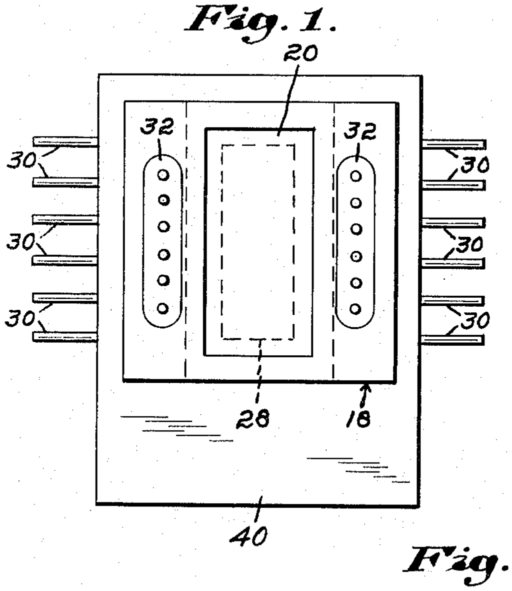
FIG. 1 is a bottom plan view of an assembly without the cover illustrating one use of the applicant's sealed electrical assembly.
Figure 2:
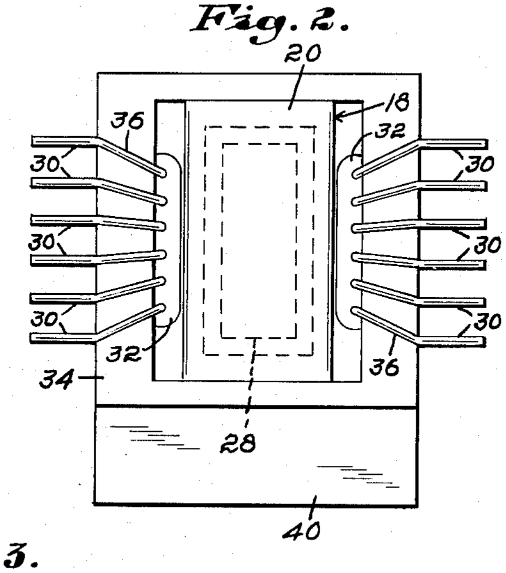
FIG. 2 is a top plan view of the assembly shown in FIG. 1 with the plate off.
Figure 3:
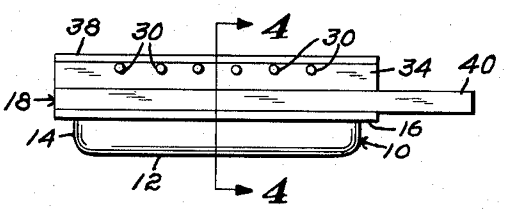
FIG. 3 is a side elevation of the assembly shown in FIG. 1.
Figure 4:
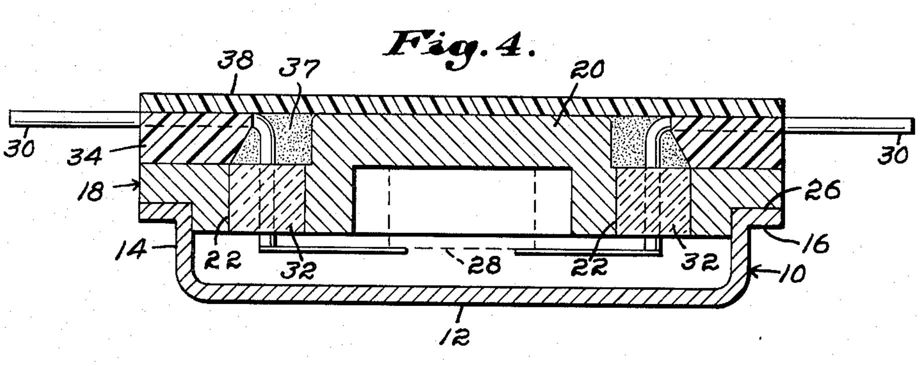
FIG. 4 is a cross section taken on line 4—4 of FIG. 3.

In the drawings there is shown an electrical assembly which utilizes a hermetic seal to protect a solid state device, such as semiconductor devices or as they are sometimes known chips.

In the past, one of the problems found with devices of this type has been the cracking of the glass seal which connects each of the multiple wire leads to the header of the assembly. This cracking occurred after the elements had been assembled because the lead frequently had to be bent at right angles to connect with another device, or when the wire lead is bent accidentally. Heretofore, there has been no method of preventing this bending stress from being transferred to the seal formed between the glass and the lead thereby causing fracture of the glass. One method utilized to attempt to prevent this is to make sure that the wire leads remain for the greatest possible portion of their length axially associated with the glass seal. A bend can then be made at a point remote from the seal along the wire lead. This creates difficulties where you are attempting to cut down on the amount of area within which the assembly must be utilized.

As shown in the drawings, the device comprises a cap 10 which is cup-shaped and includes a base portion 12 having a peripheral upstanding wall 14 integral therewith. The free terminal end of the upstanding wall 14 is bent away from the axis of the cap 10 to form a lip 16. The base portion 12 may be formed as a rectangle or as a circle if desired. In fact it may assume any geometric configuration which is necessary for the assembly.

The header 18 comprises a base part 20 having its peripheral margin formed by depressing the periphery of the base part 20 to a plane below that of the remaining portion of the base part 20. A series of apertures 22 are formed on the peripheral margin of the base part 20. It is preferable that the side wall of the aperture 22 be somewhat elongated for a purpose to be described hereinafter. The extreme periphery of the depressed portion of base part 20 is bent or depressed to provide a shoulder 26 which lies on a plane in substantially spaced parallel relationship to the plane on which the base part 20 lies. A chip 28 containing the required number of semiconductors or solid state devices is secured to the base part 20 of the header 18 so that it is circumscribed by the depressed margin of the base part 20. The attachment between the chip 28 and the base part 20 may be accomplished by any of the number of methods well known in the art.

Wire leads 30 formed of Kovar or some other appropriate material can be engaged to the header 18 by utilizing a glass seal 32 in the following manner.

A glass bead (not shown) is passed into the aperture 22 with the leads 30 already axially threaded through spaced holes formed in the bead. Heat is then applied at the glass bead which melts it into engagement with the wire and the side wall of the aperture 22 effectively forming the glass seal 32. The chip with the required solid state components is then engaged with the header 18 in the manner set forth hereinbefore. The cap 10 is then placed into abutting relationship with the header 18 with the lip 16 of the cap 10 in abutting relationship to the shoulder 26.

Resistance welding is then applied to the lip 16 and the shoulder 26 to seal the cap 10 to the header 18. The use of the resistance weld avoids the necessity of brazing and provides a better seal at lower damaging sealing temperatures to chips. An insulating ring 34 is then placed along the periphery of the header 18 circumscribing in spaced relation the base part 20 and being in close proximity to the apertures 22. If the insulating ring 34 is close enough to the walls of the apertures 22, it may be used as an "anvil" to bend the lead 30 and will assist in preventing the cracking of the glass seal 32. If the insulating ring 34 is not close enough, then a careful bend must be made in the lead; and the lead is then passed out beyond the area defined by the insulating ring 34 and through the slot 36 formed on the upper surface of the ring 34. The insulating ring also serves to provide an outer wall of a well which is formed with the header 18 and with the base part 20. A potting compound 37 may now be put into the well up to the top level of the insulating ring 34 and the base part 20. A base cover 38 can now be placed on top of the potting compound 37 and on top of the upper surfaces of the insulating ring 34 and the base part 20. This operation is performed while the potting compound 37 is still fresh and soft in consistency so that the cover 38 on the curing of the potting compound 37 will adhere to the assembly. If it is now desired to bend the leads 30 extending beyond the assembly, this may be done without any possibility of fracturing the glass seal 32 since the insulating ring 34 acts as an insulator or absorbing agent to take up the strains created by the bend.

The header itself is formed of a stamped or coined heat conductive material and one side of the header may be extended for a predetermined distance to form a combination heat sink and structure tab 40. This tab may be engaged with a supporting structure and will also serve to conduct heat which may be generated in the assembly.

While there has been illustrated and described a preferred embodiment of the invention, it should be understood that the invention can be best described by the following claim.

I claim:

An electrical assembly comprising a header having an aperture formed therethrough and having an upper surface and base part extending above the plane of said upper surface, a frangible seal formed within said aperture having a lead extending therethrough above the plane of said upper surface, an insulating member in superposed abutting relationship with said upper surface adjacent the periphery of said header, said base part lying on substantially the same plane as the top surface of said insulating member and being spaced therefrom to provide a well whose bottom is defined by said frangible seal, said lead having a portion in spaced parallel relation with an axis of said header and having a bend formed therein to provide a portion traversing said insulating member in abutting relationship throughout therewith, said bend being in close proximity to said insulating member.

References Cited by the Examiner

UNITED STATES PATENTS

| | | | |
|---|---|---|---|
| 2,194,703 | 3/1940 | Kater | 174—52 X |
| 2,498,585 | 2/1950 | Seiden | 174—59 X |
| 2,503,429 | 4/1950 | Zeigler | 174—50 X |
| 2,788,474 | 4/1957 | Jackson | 317—234 |
| 2,930,904 | 3/1960 | Fritts | 317—234 X |
| 3,100,813 | 8/1963 | Rice et al. | 174—52 |
| 3,155,885 | 11/1964 | Marino et al. | 174—52 X |

FOREIGN PATENTS

| | | |
|---|---|---|
| 861,581 | 2/1961 | Great Britain. |

JOHN F. BURNS, *Primary Examiner.*

DARRELL L. CLAY, *Examiner.*